(12) United States Patent
Gerken et al.

(10) Patent No.: US 9,534,305 B2
(45) Date of Patent: Jan. 3, 2017

(54) BUFFERED COBALT OXIDE CATALYSTS

(71) Applicant: WISCONSIN ALUMNI RESEARCH FOUNDATION, Madison, WI (US)

(72) Inventors: James B Gerken, Madison, WI (US); Shannon S. Stahl, Madison, WI (US)

(73) Assignee: WISCONSIN ALUMNI RESEARCH FOUNDATION, Madison, WI (US)

( * ) Notice: Subject to any disclaimer, the term of this patent is extended or adjusted under 35 U.S.C. 154(b) by 0 days.

(21) Appl. No.: 14/571,574

(22) Filed: Dec. 16, 2014

(65) Prior Publication Data

US 2015/0144497 A1    May 28, 2015

Related U.S. Application Data

(60) Division of application No. 13/509,674, filed as application No. PCT/US2010/058150 on Nov. 29, (Continued)

(51) Int. Cl.
C25B 11/00    (2006.01)
C25B 11/04    (2006.01)
(Continued)

(52) U.S. Cl.
CPC ....... *C25B 11/0405* (2013.01); *C01B 13/0207* (2013.01); *C25B 1/04* (2013.01); *C25B 11/0442* (2013.01); *C25B 11/0478* (2013.01); *C25B 11/0489* (2013.01); *B01J 23/75* (2013.01); *B01J 37/348* (2013.01); *Y02E 60/366* (2013.01)

(58) Field of Classification Search
CPC ..... C25B 1/02; C25B 1/04–1/12; C25B 11/00; C25B 11/04; C25B 11/0405; C25B 11/0442; C25B 11/0478; C25B 11/0489; B01J 23/75; B01J 27/04–27/043; B01J 27/053; B01J 27/06–27/128; B01J 27/14; B01J 27/1853
See application file for complete search history.

(56) References Cited

U.S. PATENT DOCUMENTS

| | | | |
|---|---|---|---|
| 4,470,894 A | 9/1984 | Dyer | |
| 7,615,315 B2 * | 11/2009 | Tatsumi | ................. C01G 51/42 423/464 |
| 2010/0101955 A1 * | 4/2010 | Nocera | ..................... C25B 1/04 204/547 |

FOREIGN PATENT DOCUMENTS

| | | | | |
|---|---|---|---|---|
| FR | CA 2028595 A1 * | 4/1991 | ......... | C25B 11/0478 |
| WO | 0123090 A1 | 4/2001 | | |
| WO | 0198560 A2 | 12/2001 | | |

OTHER PUBLICATIONS

Lee et al (Reaction Kinetics and Catalysis Letters, 2008, vol. 93, Issue 1, p. 75-83).*

* cited by examiner

*Primary Examiner* — Luan Van
*Assistant Examiner* — Alexander W Keeling
(74) *Attorney, Agent, or Firm* — Boyle Fredrickson, S.C.

(57) ABSTRACT

Disclosed are electrolysis catalysts formed from cobalt, oxygen and buffering electrolytes (e.g. fluoride). They can be formed as a coating on an anode by conducting an electrolysis reaction using an electrolyte containing cobalt and an anionic buffering electrolyte. The catalysts will facilitate the conversion of water to oxygen and hydrogen gas at a range of mildly acidic conditions. Alternatively, these anodes can be used with cathodes that facilitate other desirable reactions such as converting carbon dioxide to methanol.

10 Claims, 9 Drawing Sheets

Related U.S. Application Data 2010, now Pat. No. 8,956,525, which is a continuation of application No. 12/628,464, filed on Dec. 1, 2009, now Pat. No. 8,192,609.

(60) Provisional application No. 61/380,915, filed on Sep. 8, 2010.

(51) Int. Cl.
| | |
|---|---|
| *C01B 13/02* | (2006.01) |
| *C25B 1/04* | (2006.01) |
| *B01J 23/75* | (2006.01) |
| *B01J 37/34* | (2006.01) |

BUFFERED COBALT OXIDE CATALYSTS

CROSS-REFERENCE TO RELATED APPLICATIONS

This application is a divisional application of U.S. patent application Ser. No. 13/509,674 filed May 14, 2012, which is the U.S. National Stage application claiming priority to International Application PCT/US2010/058150 filed Nov. 29, 2010, which claims the benefit of U.S. Provisional Application 61/380,915 filed Sep. 8, 2010. PCT/US2010/058150 is also a continuation of U.S. application Ser. No. 12/628,464 filed Dec. 1, 2009, which has now issued as U.S. Pat. No. 8,192,609.

STATEMENT REGARDING FEDERALLY-SPONSORED RESEARCH OR DEVELOPMENT

This invention was made with government support under 0802907 awarded by the National Science Foundation. The government has certain rights in the invention.

BACKGROUND OF THE INVENTION

The present invention relates to catalysts useful to form portions of electrolysis anodes. More particularly, it relates to cobalt/oxygen/buffering electrolyte (e.g. cobalt/oxygen/fluorine) based catalysts suitable to facilitate water electrolysis.

The search for compositions to catalyze electrolysis of water is primarily currently driven by the desire to store renewable energy (e.g. solar or wind energy) in the form of hydrogen gas, with the hydrogen gas then becoming a more practical substitute for fossil fuels in applications such as automobiles. FIG. 1 depicts schematically a prior art water electrolysis system. A container 2 stores an aqueous solution 3. An anode 4 and a cathode 6 are positioned in a water based electrolyte solution and then linked to a current source (not shown). A diaphragm isolates the gases developed by splitting water into its constituent gases.

This prior art technology generates oxygen and hydrogen in this application. However, it does so in such an energy inefficient manner so as to render the process commercially impractical as a means of converting solar energy or the like to hydrogen gas fuel. In this regard, the electrolytic gas production involves transfer of four protons and four electrons with the formation of an oxygen-oxygen bond at the anode concomitant with reduction of protons at the cathode. A substantial amount of energy to drive that reaction at some useful rate must be provided over the theoretical minimums required (the "overpotential").

Efforts have been made to try to reduce the amount of overpotential needed to drive the reaction by using specialized anodes and/or a catalyst. This has helped somewhat. However, there are still significant commercial impediments to implementing their use.

For example, some catalysts degrade under the reaction conditions required. Others are not widely available at reasonable cost, or do not reduce the required overpotential sufficiently.

Some cobalt oxide materials have been tried as water-electrolysis catalysts in hydroxide electrolyte systems. These consist of $Co^{III}$ oxide clusters which are active in strongly basic media. They appear to proceed via a process involving $Co^{II}$, $Co^{III}$, and $Co^{IV}$-oxo species. These require basic conditions to efficiently function, as hydroxide is both the electrolyte and buffer, and must operate at elevated temperatures for optimal efficiency. Cathode driven reactions (e.g. the formation of hydrogen from water, or the conversion of carbon dioxide gas to methanol) have specific pHs for their most efficient production. These do not correlate with the conditions of this prior art cobalt system.

In U.S. Pat. No. 3,399,966 there was a disclosure of a cobalt oxide coating on an electrolysis anode, used in one example with fluoborate electrolyte. However, this did not adequately address the overpotential concern.

In unrelated work it is known that $CoF_3$ and fluorocobaltate$^{III}$ salts react with water to liberate oxygen and HF. See H. Priest, Anhydrous Metal Fluorides, 3 Inorg. Syn. 171-183 (1950); V. Ustinov et al., Separation Of Oxygen Isotopes In The Fluorination Of Oxygen-containing Compounds, 52 Zh. Fiz. Khim. 344-347 (1978); V. Klemm et al., Über Fluorocobaltate(III) und -(IV) und Fluoroniccolate(III), 308 Anorg. Allg. Chem. 179-189 (1961).

Further, there have been some attempts to describe aqueous and non-aqueous solutions containing both cobalt and fluoride ions in the context of electrochemical studies. See A. Kappanna et al., Anodic Reactions In The Electrolysis Of Acid-Cobalt-Fluoride, 18 Current Science 27 (1958); B. Cox et al., Complex Fluorides . . . , J. Chem. Soc. 1798-1803 (1954); M. Meyers et al. The Preparation, Structures . . . , 82 J. Am. Chem. Soc. 5027-5030 (1960); and T. Court et al., Solution Chemistry Of Cobalt In Liquid Hydrogen Fluoride, 6 J. Fluorine Chem. 491-498 (1975).

The production of a water oxidation catalyst by electrolysis of solutions of $Co^{2+}$ salts in aqueous phosphate, borate, and methylphosphonate buffers has also recently been reported. M. Kanan et al., In Situ Formation Of An Oxygen-Evolving Catalyst In Neutral Water Containing Phosphate And $Co^{2+}$, 321 Science 1072-1075 (2008); and Y. Surendranath et al., Electrolyte-Dependent Electrosynthesis., 131 J. Am. Chem. Soc. 2615-2620 (2009). However, the required overpotential at useful current densities is a significant impediment to commercial application and the pH of the system is limited to neutral or mildly alkaline values.

Hence, there still is a need for improvements for converting water to oxygen and hydrogen in electrolysis reactions

SUMMARY OF THE INVENTION

In one aspect the invention provides a method for generating a gas selected from the group consisting of oxygen and hydrogen via an electrolysis reaction. One places an anode and a cathode in aqueous solution, wherein at least a portion of the aqueous solution adjacent the anode has water, cobalt cation and an anion (e.g. fluoride) electrolyte. One then uses an external source of electricity to drive the electrolysis reaction at a pH of between 3 and 6.8 from the anode and cathode. The selected gas(es) is/are thereby generated.

Preferably the anion electrolyte is selected from the group consisting of fluoride, fluorophosphate, trifluoromethyl sulfonamide, other perfluoroalkyl sulfonamides, trifluoromethyl phosphonate, other perfluoroalkyl phosphonates, perfluoro-tert-butoxide, other perfluorinated tertiary alkoxides, deprotonated hexafluoroacetone hydrate, other anions of perfluorinated dialkyl ketone hydrates, and chromate, and the gas is one or more of hydrogen generated at the cathode and oxygen generated at the anode.

In another aspect during the method a catalyst that has cobalt, oxygen and the anion electrolyte is deposited on the anode.

Most preferably the cobalt cation is present in the aqueous solution adjacent the anode at a concentration of between 0.1 and 100 mM (e.g. around 1 mM), and the anion is present in the aqueous solution adjacent the anode at a concentration between 0.01 and 2 M (e.g. between 0.1 M and 1 M). This can be with or without other cations such as nickel or zinc.

In another form the invention provides a method for generating a gas selected from the group consisting of oxygen and hydrogen from water via an electrolysis reaction. One places an anode and a cathode in water. The anode comprises a substrate having a catalyst coating, the catalyst coating comprising cobalt, oxygen and an anion selected from the group consisting of fluoride, fluorophosphate, trifluoromethyl sulfonamide, other perfluoroalkyl sulfonamides, trifluoromethyl phosphonate, other perfluoroalkyl phosphonates, perfluoro-tert-butoxide, other perfluorinated tertiary alkoxides, deprotonated hexafluoroacetone hydrate, other anions of perfluorinated dialkyl ketone hydrates, and chromate. One then uses an external source of electricity to drive the electrolysis reaction from the anode and cathode to generate the gas.

Where the catalyst has fluoride as the anion the catalyst coating on the anode preferably has about two oxygens for each cobalt and the catalyst is about 5-9%, more preferably about 7%, fluorine as fluoride. For example, in one sample the ratios were Co:O:F at 4.24:8.9:1.

While a variety of known anode materials suitable for use in electrolysis of water can be used for the substrate material, we prefer the substrate to be a tin oxide selected from the group consisting of indium tin oxide and fluorine tin oxide.

In one example, the generated gas can be both hydrogen and oxygen, hydrogen can be generated at the cathode, and oxygen can be generated at the anode. The substrate can be an electrically conductive tin oxide based substrate.

In yet another form the invention provides an anode suitable for generating oxygen in an electrolysis reaction. The anode has a substrate, and a catalytic coating positioned on the substrate which comprises cobalt, oxygen, and an anion selected from the group consisting of fluoride, fluorophosphate, trifluoromethyl sulfonamide, other perfluoroalkyl sulfonamides, trifluoromethyl phosphonate, other perfluoroalkyl phosphonates, perfluoro-tert-butoxide, other perfluorinated tertiary alkoxides, deprotonated hexafluoroacetone hydrate, other anions of perfluorinated dialkyl ketone hydrates, and chromate.

Preferably this catalytic coating was positioned on the substrate by electrolytic film deposition of the catalytic coating on the substrate during an electrolysis reaction in which the substrate was positioned in an aqueous solution comprising cobalt cation and the selected anion.

A particularly desirable application of the anode is an electrolysis cell comprising such an anode as well as a cathode. The cathode may have varied purposes. In one aspect it may generate hydrogen gas. Alternatively, it may be used for another reduction purpose such as converting carbon dioxide to methanol. See generally G. Seshadri et al., A New Homogeneous Electrocatalyst For The Reduction Of Carbon Dioxide To Methanol At Low Overpotential, 372 Journal Of Electroanalytical Chemistry 145-150 (1994); E. Cole et al., Using A One-Electron Shuttle For the Multielectron Reduction Of $CO_2$ To Methanol: Kinetic, Mechanistic, And Structural Insights, 132 J. Am. Chem. Soc. 11539-11551 (2010).

In a further method of the present invention one can form such anodes by positioning the substrate in an aqueous solution comprising cobalt cation and the selected anion, and conducting an electrolysis reaction using the substrate as an anode in that reaction.

As another application of the present invention, one can generate electricity using a renewable or other energy source (e.g. solar cell or wind turbine), use that electricity to drive the electrolysis reactions of the present invention, and collect the resulting hydrogen gas for use as an alternative fuel source for a vehicle or other device. The collected oxygen gas can be used for numerous other known purposes (e.g. enhancing oxygen content in room air in buildings).

The reaction can be conducted in a large scale production facility, or can be conducted via a residential size generation system. Using the latter approach homeowners could, for example, use energy generated by solar cells or wind turbines to create a way of refueling their automobiles.

The catalysts/anodes of the present invention function efficiently (with comparatively low rise in overpotential with increase in current density), without requiring highly basic reaction conditions, even at ambient room conditions. Further, they appear to be stable under the highly oxidizing conditions experienced by these reactions. Also, cobalt and the specified anions are available in relatively high quantities, at relatively low cost. These factors are important in making such fuel generation systems more commercially practical.

Moreover, by selection of one of the buffering electrolytes one can select desirable acidic pH operating conditions for specific applications. Note that too low a pH (e.g. the sulfate pH) will cause problems such as not depositing the catalyst and/or generating side reactions such as the creation of hydrogen peroxide. Specifically, we have conducted experiments confirming that below pH 3 there is a shift from oxygen-producing heterogeneous catalysis to homogeneous catalysis, thereby yielding by-product.

Too high a pH (e.g. neutral to basic pHs) will cause the cathodic reaction to be at a non-optimal pH, or cause quite expensive modifications to be needed to the overall cell.

The above and still other advantages of the present invention will be apparent from the description that follows. It should be appreciated that the following description is merely of preferred embodiments of our invention. The claims should therefore be looked to in order to understand the full claimed scope of the invention.

DETAILED DESCRIPTION OF THE INVENTION

To create one electrolyte solution we add to water cobalt cation at around 1 mM, such as by adding $CoSO_4$, $CoCl_2$, $Co(NO_3)_2$ or the like. We also add a fluoride anion at a concentration of about 0.1 M. We preferred providing the fluoride anion in the form of a pH buffered mixture of KF and HF. In our experiments with varied pHs the pH was adjusted by the addition of $KHF_2$ or NaOH as needed.

In other electrolyte solutions we added to water cobalt cation at around 1 mM, such as by adding $CoSO_4$, $CoCl_2$, $Co(NO_3)_2$ or the like. We also added our selected buffering electrolyte, typically at a concentration of about 0.1 M or 1 M. All potentials are given relative to the NHE reference electrode.

Figure 1:
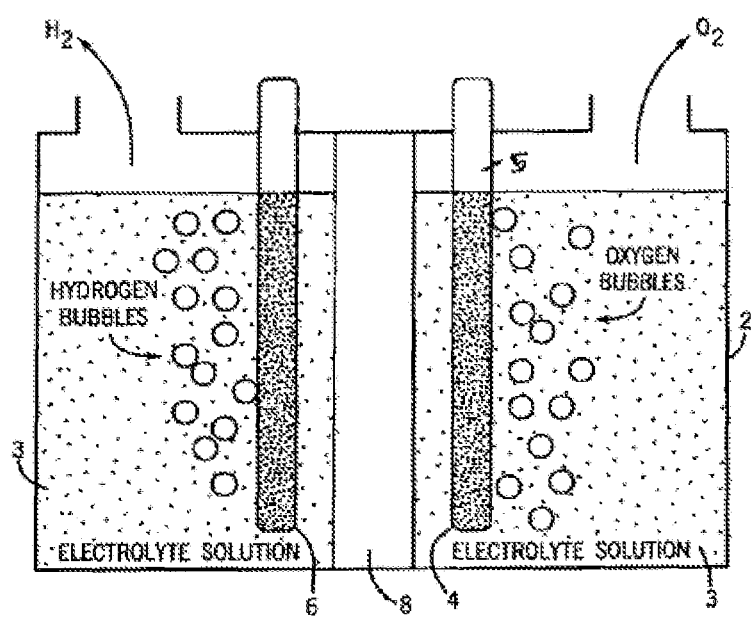
FIG. 1 schematically depicts a prior art system for conducting electrolysis of water.

In the FIG. 2-FIG. 6 experiments we causes electrolytic film deposition of our catalyst by operating the FIG. 1 device using the aforesaid electrolytic solution at about 1.48 volts (e.g. 1.33 volts to 1.58 volts). Once the anode has been coated with our catalyst, it is no longer critical that the electrolyte solution contain both the cobalt or fluoride. It could continue to be operated with fluoride.

Figure 2:
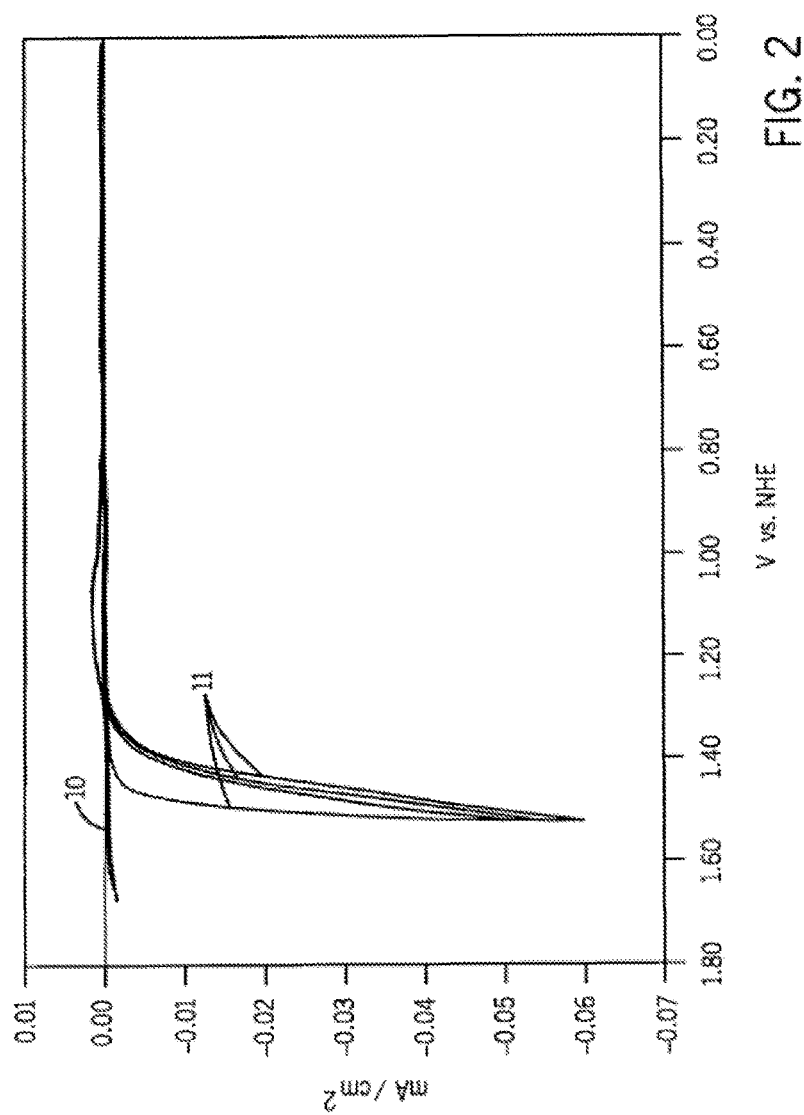
FIG. 2 compares the effect, in a FIG. 1 type system, of an electrolytic solution with no cobalt (10) with using the identical system with cobalt also added (11).

FIG. 2 depicts the results of cyclic voltammetry scans of an indium tin oxide substrate anode in 0.1 M KF electrolyte with and without 1 mM $CoSO_4$ at pH 5. The vertical axis is the log current density. The horizontal axis is voltage. In the presence of cobalt ions (11) there was an abrupt production of catalytic current. As the voltage is scanned back, there was a broad cathodic peak centered at $E_{p,c}=1.07$ V.

Figure 3:
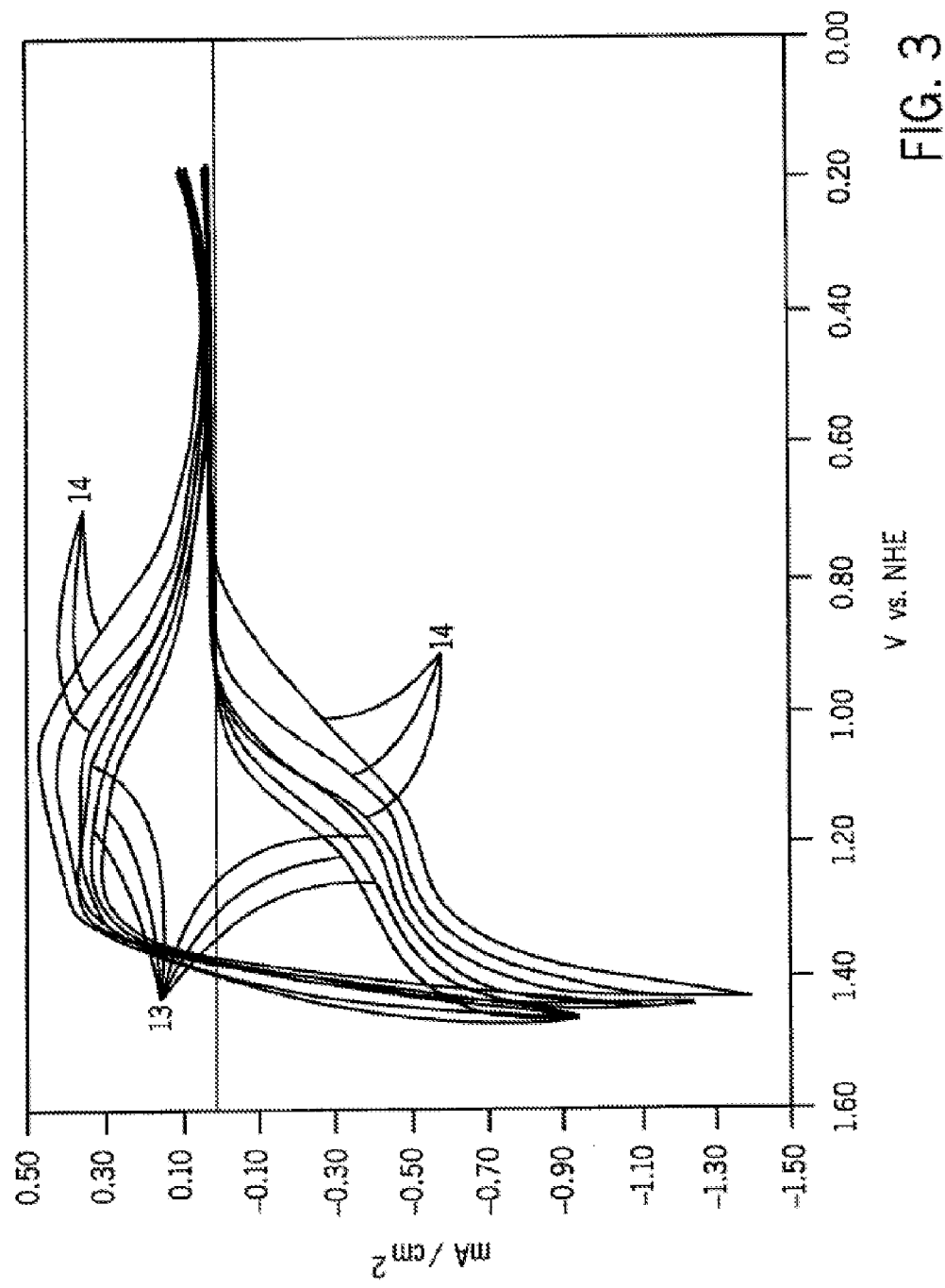
FIG. 3 shows comparative experiments taken after a catalyst coating from the (11) experiments has deposited on the anode, comparing the results of that (13), with the use of that coated catalyst anode in cobalt-free solution (14).

Subsequent to electrodeposition we ran the FIG. 3 experiments. Continued controlled-potential (CPE) electrolysis at 600 s 1.48 V, in 0.1 M fluoride at pH 5 with 1 mM $CoSO_4$, and following a subsequent 600 s. CPE at 1.48 V in cobalt-containing buffer led to deposition of a film of material that showed increased catalytic current on subsequent cyclic voltammetric scans. These (13) experiments showed an anodic wave at ~1.2 V that blended into the catalytic current.

A subsequent cyclic voltammetric scan following rinsing of the electrode and electrolysis in fresh pH 5 fluoride buffer for 10 min at 1.48 V confirmed that even without cobalt in the electrolyte solution the coated anode retained essentially the same activity (14). Note that in our experiments the catalytic effect was noted unless the electrode is held at potentials more reducing than the cathodic wave at ~1 V, below which dissolution of the catalyst is observed.

Figure 4:
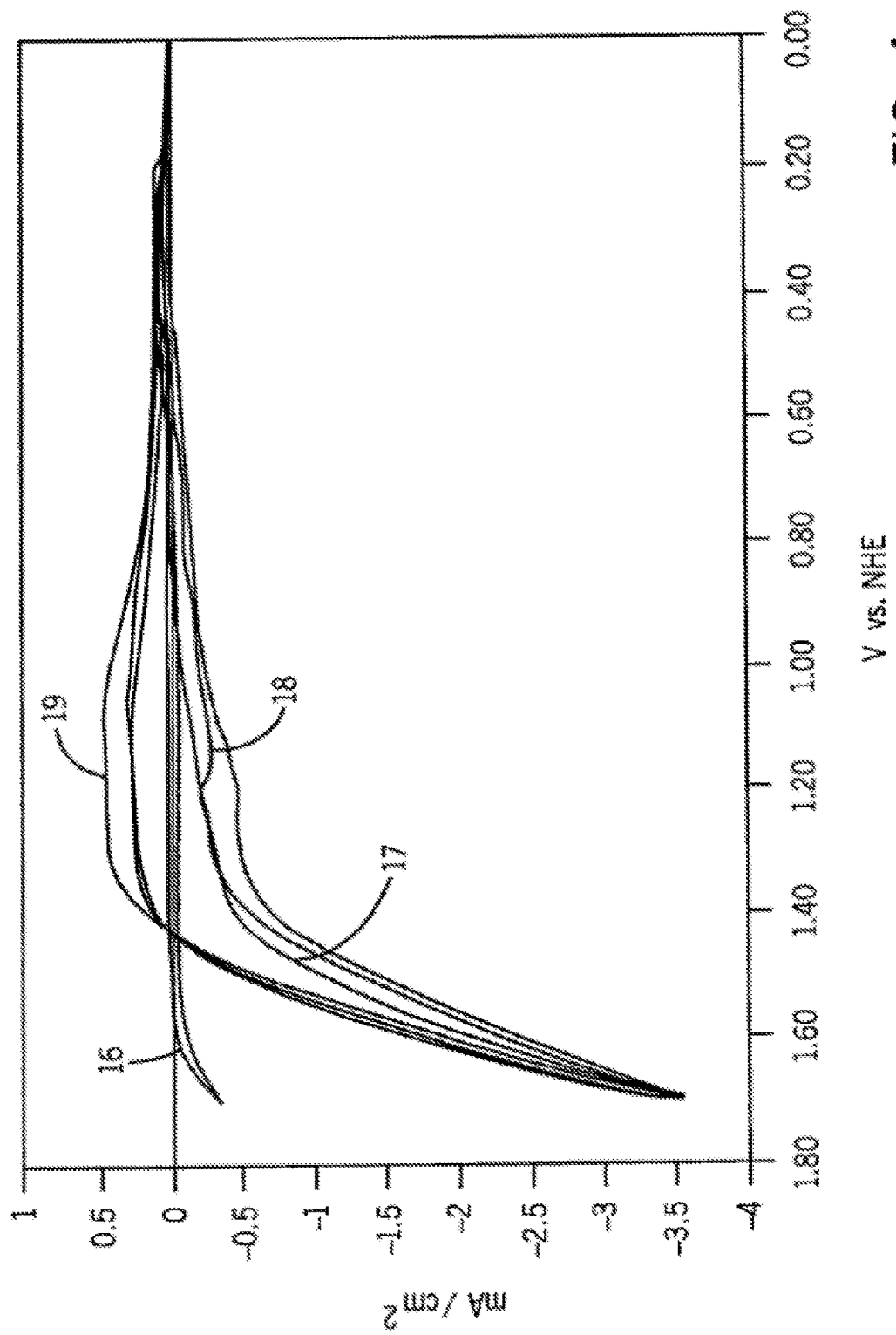
FIG. 4 shows similar experiments as with (13) at pH 3.0 (16), pH 4.5 (17), pH 5.5 (18) and pH 7.1 (19).
Figure 5:
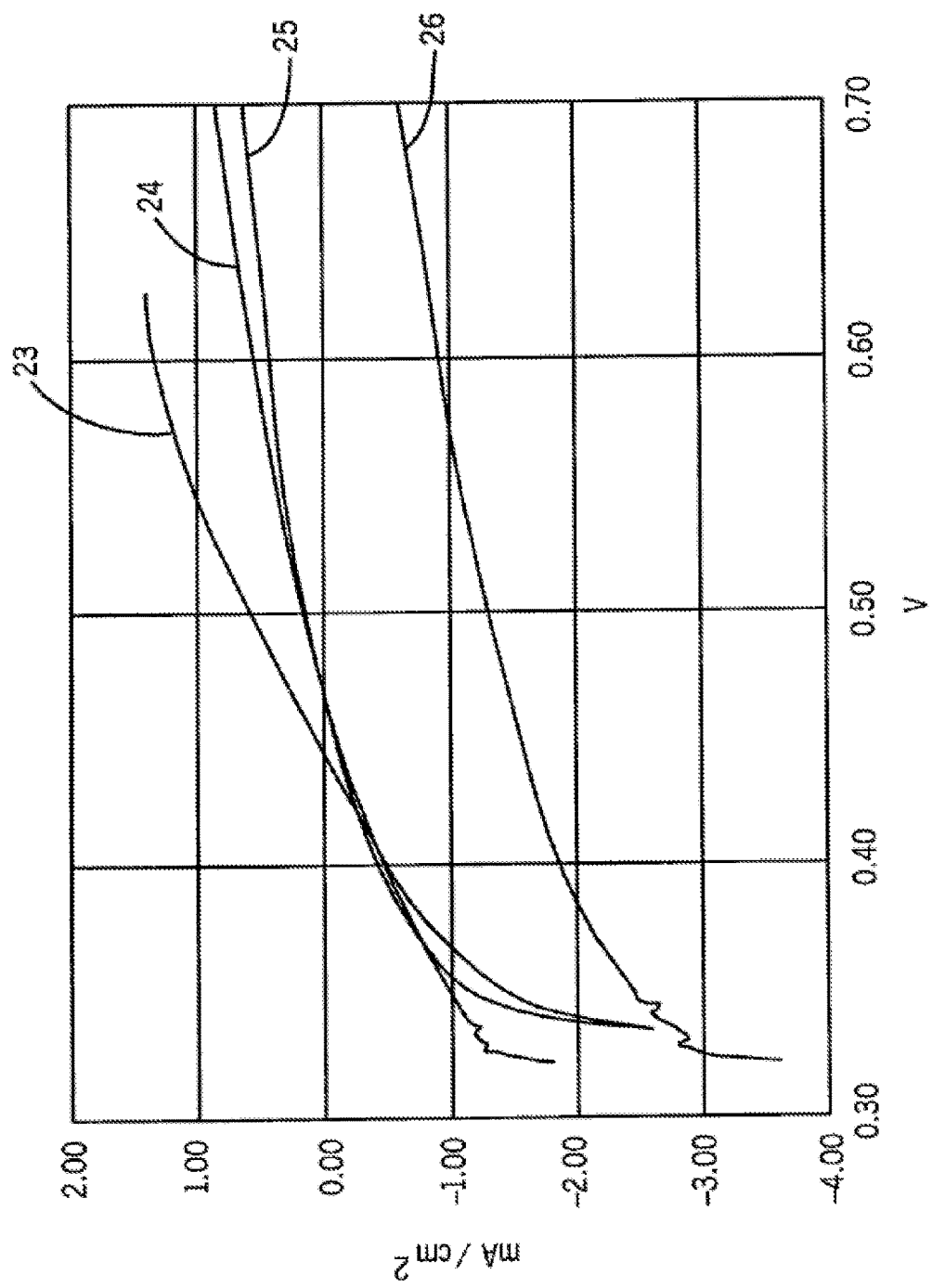
FIG. 5 shows similar experiments where the electrolyte contained fluoride at pH 3.5 (23/24), or contained phosphate at pH 7.0 (25/26).

As depicted in FIG. 4, we then compared the effect of different pHs using a graphite anode. We found that even at pHs around neutral the catalytic effects are quite efficient.

We then sought to compare the efficiency of our catalyst with catalytic results using another anion besides fluoride, with cobalt. These experiments are depicted on FIG. 5. The FIG. 5 experiments confirm the superiority of the fluoride anion (23)/1 M or (24)/0.1 M versus phosphate (25) or (26) at those molarities. We compared the log of the current density versus overpotential.

Figure 6:
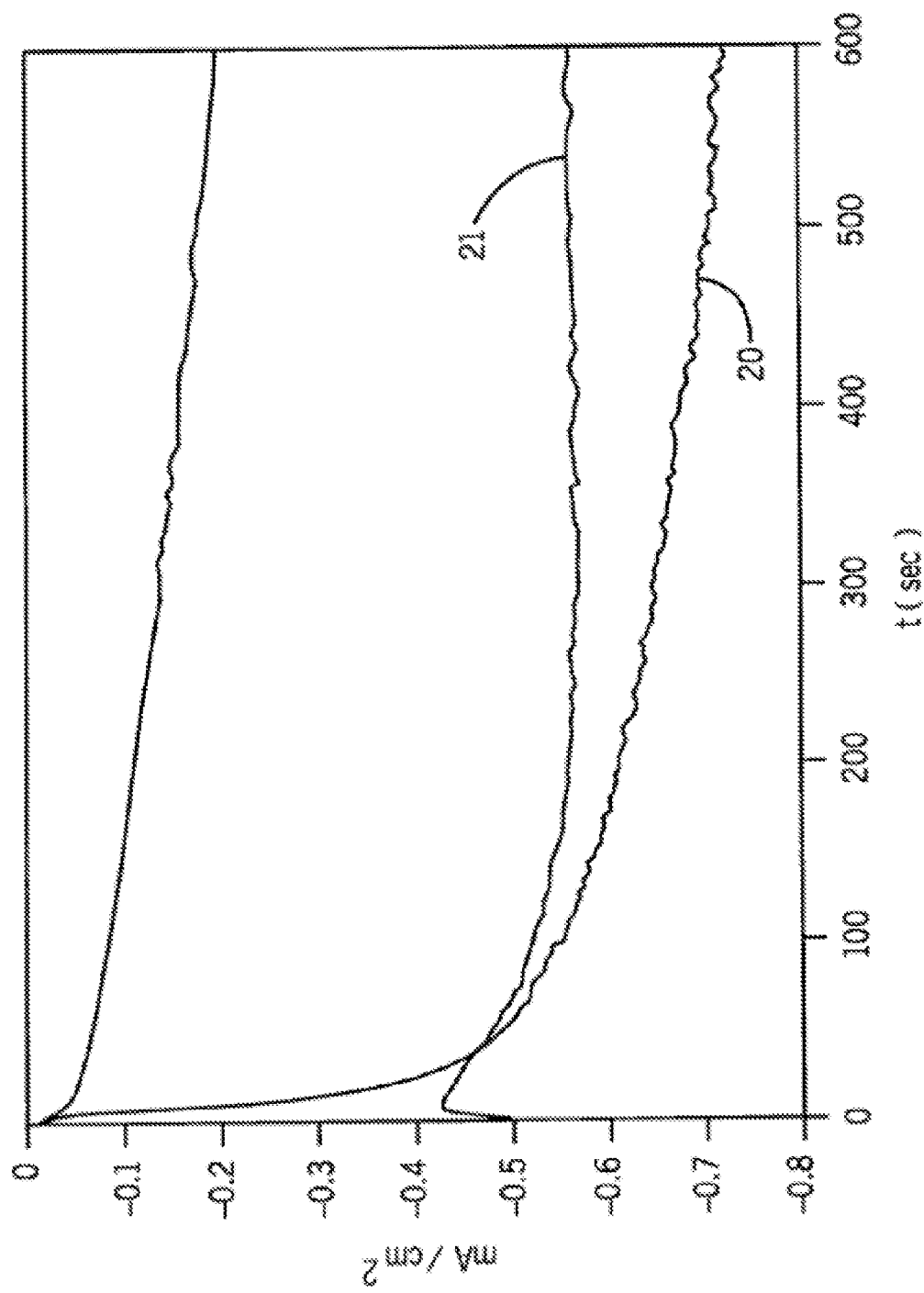
FIG. 6 compares current density versus time effects where the electrolyte contained fluoride (20), or contained phosphate (21).

We then ran an experiment involving constant-potential electrolyses of fluoride-buffered cobalt solutions in a stirred, undivided cell (without the diaphragm 8). These experiments were not focused on the collection of the gases. FIG. 6 experiments were run at an initial pH of 5, and showed the pattern of current increase reflecting deposition as graphed. With the increase in current there was formation of increased visible deposit on the electrode and bubbling. Fluoride results (20) were superior to phosphate (21), and vastly superior to sulfate.

In prolonged electrolyses in cobalt-free buffer at lower pH, we noted that there was a decrease in current over time. We attribute this to slight dissolution of the visible coating on the anode. This suggests that the pKa of HF is close to that of the solid. However, steady state is achieved at approximately 0.1 mM $Co^{++}$. Alternatively, increasing the fluoride concentration in the electrolyte solution after anode coating formation was found to lead to a more stable deposit.

Figure 7:
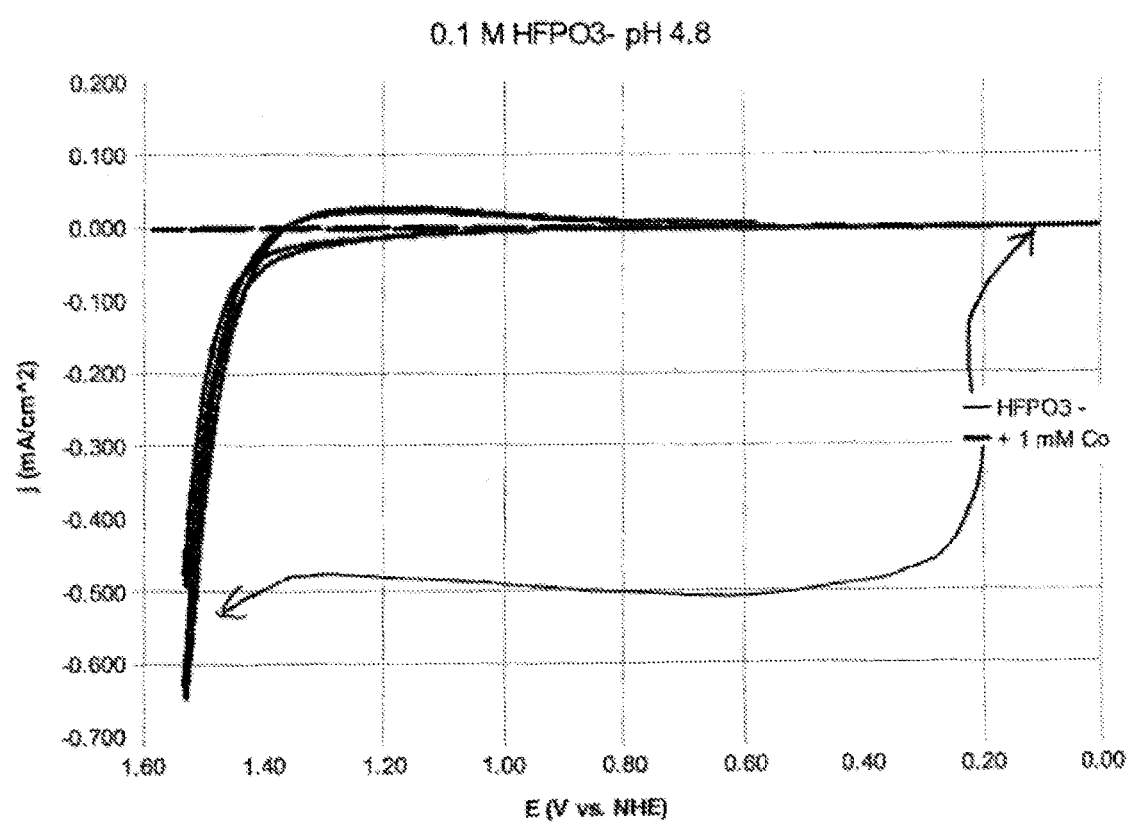
FIG. 7 shows test results from the operation of a FIG. 1 type cell using fluorophosphate electrolyte.

In the FIG. 7 experiment we used 0.1 M fluorophosphate presented as sodium monofluorophosphate adjusted with sulfuric acid or sodium hydroxide to a pH of 4.8. Catalyst was deposited at about 1.3 V and the resulting cell then worked efficiently at about 1.6 V.

Figure 8:
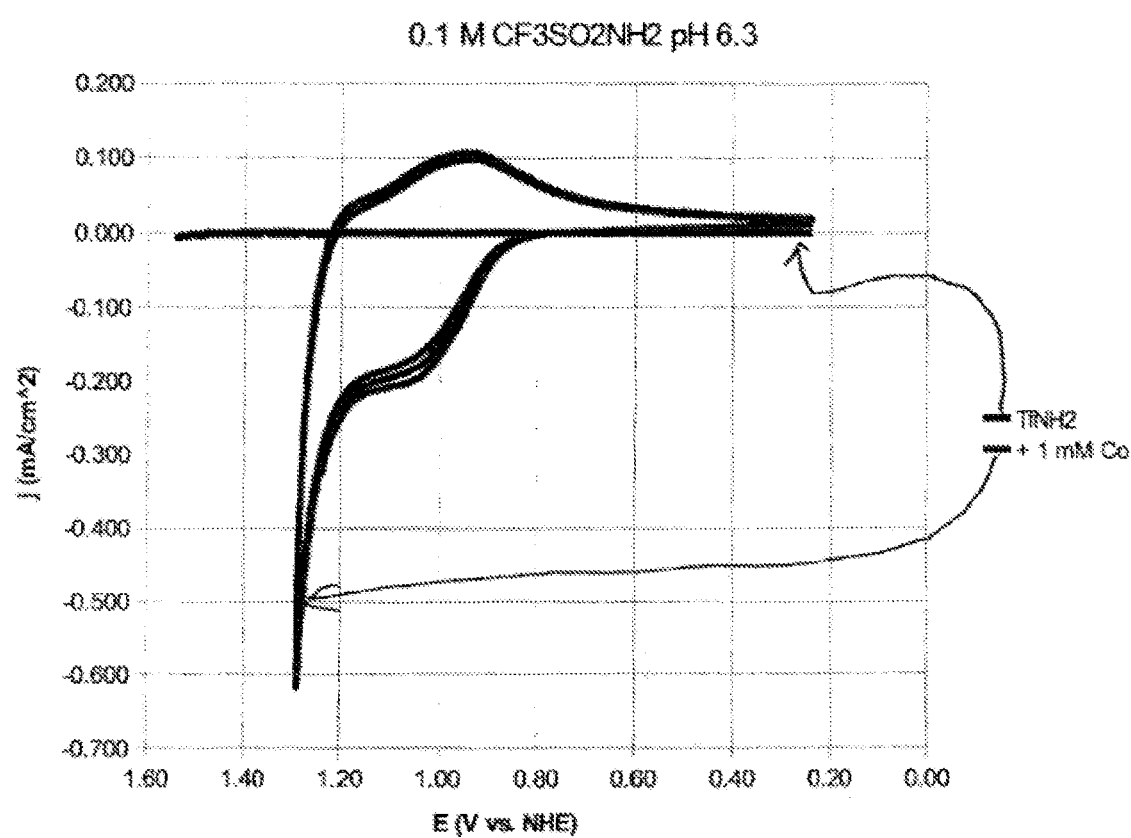
FIG. 8 shows test results from the operation of a FIG. 1 type cell using trifluoromethyl sulfonamide electrolyte.

In the FIG. 8 experiment we used 0.1 M of trifluoromethyl sulfonamide adjusted with sodium hydroxide to a pH of about 6.3. Catalyst was deposited on the anode at 1.05 V and the resulting cell then worked efficiently at about 1.55 V.

Figure 9:
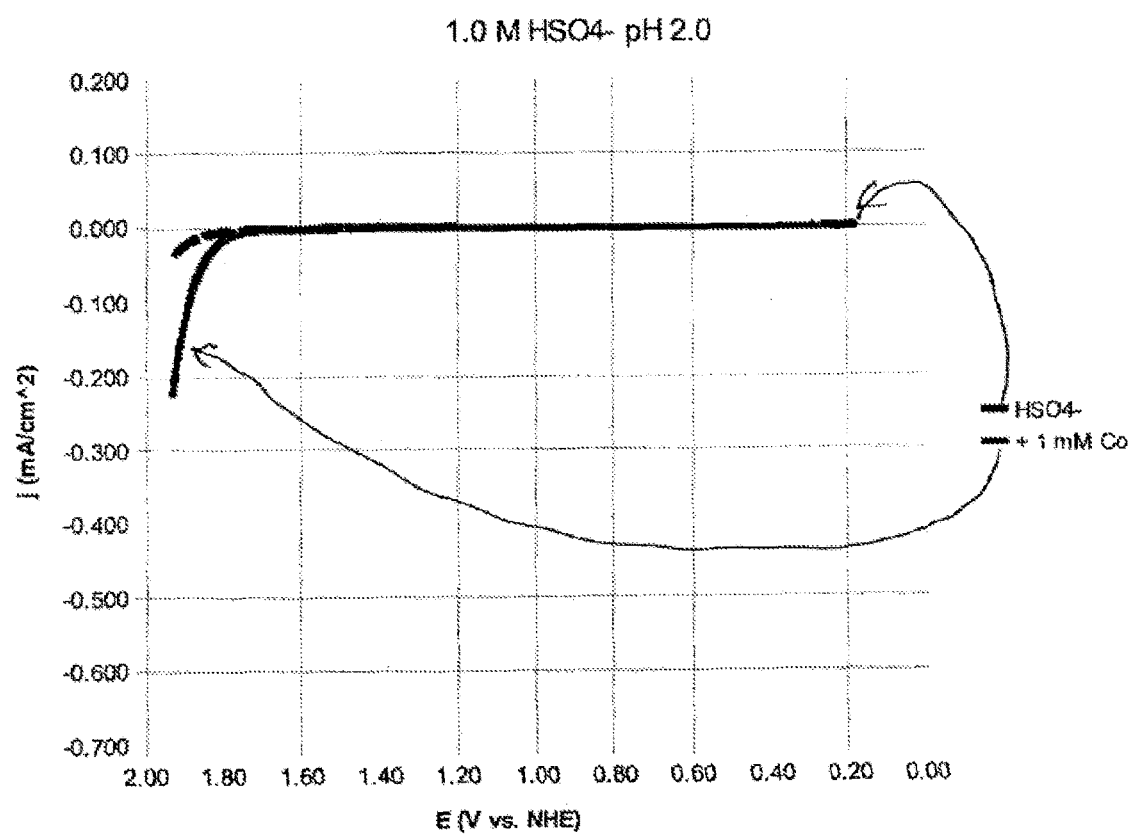
FIG. 9 shows test results from the operation of a FIG. 1 type cell using sulfate electrolyte.

In the FIG. 9 experiment we used 1 M sulfate presented at a 50/50 mix of sodium sulfate and sodium bisulfate adjusted with sulfuric acid and sodium hydroxide to a pH of 2.2. Catalyst was not deposited on the anode.

Our preliminary experiments with chromate indicate similar utility. Thus, as yet another alternative we are proposing 1 M chromate presented as a mix of sodium chromate and chromium trioxide adjusted with sodium hydroxide to a pH of about 6.5.

As a further alternative we are proposing 1 M trifluoromethyl phosphonate or other perfluoroalkyl phosphonate presented as the perfluoroalkyl phosphonic acid adjusted with sodium hydroxide to a pH of about 6.5.

As yet another alternative we are proposing 1 M perfluoro-tert-butoxide or other perfluorinated tertiary alkoxides, deprotonated hexafluoroacetone hydrate or other anions of perfluorinated dialkyl ketone hydrates presented as the perfluorinated alcohol or ketone adjusted with sodium hydroxide to a pH of about 4.5.

The cathode (6) can be any cathode suitable for use in water electrolysis under the conditions we are exposing the cathode to. Particularly preferred cathodes are platinum or platinized graphite cathodes.

The anode (4) begins with a substrate (5), which again can be any anode suitable for use in water electrolysis under the conditions we are exposing the anode to. Particularly preferred substrates for the anode are materials such as tin oxides, particularly indium tin oxide or fluorine tin oxide.

Once the anode has been coated with our catalyst, it is no longer critical that the electrolyte solution contain both the cobalt and the anion. It could continue to be operated without the cobalt, using the anion.

One can generate oxygen gas using our improved anode (along with hydrogen at the cathode). An electrode prepared by the constant-potential deposition can be placed in 0.1 M-1 M anion, in a closed, divided cell like that of FIG. 1, and linked to a pressure transducer. The presence of gas generation at both the anode and cathode can be confirmed.

Further, we note that we ran some studies of the nature of the catalysts. In one experiment we determined that the catalyst contained cobalt, oxygen, and fluorine, in about the ratio of one fluorine, to 4.24 cobalt, to about 8.9 oxygen. We believe that the fluorine is present as fluoride in the material. SEM images of the deposit show a layer of fused spherical nodules. The catalyst appears yellow-brown.

We believe that with this catalyst F acts as a proton acceptor during oxidation of cluster sites bearing either a Co(H$_2$O) or CoOH moiety en route to O—O bond formation, with either subsequent proton transfer to or exchange of the formed HF with F in solution. The inability of catalytically competent deposits to form anywhere near as well in sulfate electrolyte solutions at low cobalt concentration suggests that SO$_4^{2-}$ is too weak of a base.

Our experiments with fluoride suggest that the fluoride is acting in some more complicated role than phosphate does. We believe that it is not just acting as a base. Fluoride can act as a ligand on cobalt, and fluoride is also a strong hydrogen-bond acceptor that may play a role in activating water molecules towards reaction with the catalytic center.

As cobalt oxyfluoride compounds are readily produced, we favor the explanation that a cobalt oxide cluster containing at least one fluoride ligand is formed to create the claimed catalyst, and that this undergoes exchange with water to form an aqua-complex which engages in electron-coupled proton transfer to outer-sphere fluoride to yield clusters containing a Co(O) species which produces the observed water oxidation.

While a number of embodiments of the present invention have been described above, the present invention is not limited to just these disclosed examples. There are other modifications that are meant to be within the scope of the invention and claims. Thus, the claims should be looked to in order to judge the full scope of the invention.

INDUSTRIAL APPLICABILITY

The present invention provides catalytic materials for use in water electrolysis and other reduction reactions, where the catalyzed reaction can be conducted at mildly acidic conditions. It also provides anodes useful in these methods, methods of forming these anodes, and methods of generating a fuel and oxygen gas using them, thereby providing a more practical way of storing renewable energy.

We claim:

1. An anode suitable for generating oxygen in an electrolysis reaction, comprising:
   a substrate; and
   a catalytic coating positioned on the substrate which comprises cobalt, oxygen, and an anion selected from the group consisting of perfluoroalkyl sulfonamides, and anions of perfluorinated dialkyl ketone hydrates.

2. The anode of claim 1, wherein the catalytic coating was positioned on the substrate by electrolytic film deposition of the catalytic coating on the substrate during an electrolysis reaction in which the substrate was positioned in an aqueous solution comprising cobalt cation and the selected anion.

3. An electrolysis cell comprising the anode of claim 1 and further comprising a cathode.

4. The electrolysis cell of claim 3, wherein the cathode is suitable to generate hydrogen gas.

5. The electrolysis cell of claim 3, wherein the cathode is suitable to convert carbon dioxide to another carbon containing material.

6. The electrolysis cell of claim 5, wherein the cathode is suitable to convert carbon dioxide to methanol.

7. The anode of claim 1, wherein the selected anion is a perfluoroalkyl sulfonamide.

8. The anode of claim 7, wherein the selected perfluoroalkyl sulfonamide is trifluoromethyl sulfonamide.

9. The anode of claim 1, wherein the selected anion is an anion of a perfluorinated dialkyl ketone hydrate.

10. The anode of claim 9, wherein the selected anion of a perfluorinated dialkyl ketone hydrate is deprotonated hexafluoroacetone hydrate.

* * * * *